UNITED STATES PATENT OFFICE.

ADAM CHARLES GIRARD, OF PARIS, FRANCE.

PROCESS OF MAKING PICRATES.

SPECIFICATION forming part of Letters Patent No. 669,030, dated February 26, 1901.

Application filed February 3, 1900. Serial No. 3,825. (No specimens.)

*To all whom it may concern:*

Be it known that I, ADAM CHARLES GIRARD, a citizen of the Republic of France, and a resident of Paris, France, have invented new and useful Improvements in Processes of Making Picrates, which is fully set forth in the following specification.

The picrates, the sensitiveness to shock and destructive power of which are so well known, are manufactured industrially either by a process of double decomposition or by direct saturation of the acid in water. The manufacture of this substance is extremely dangerous and has often caused explosions during the concentration of the solutions, but more often at the time when the crystals are removed from the crystallizers or during the process of drying in a stove or in the free air. Moreover, the presence of explosive or inflammable dust forms another great danger.

The present invention relates to an improved process of preparing alkaline picrates or alkaline earth or earth or metallic picrates under such conditions that all danger of explosion is avoided not only during the process of manufacture itself, but also during the use of the material in the preparation of the explosives.

The picrates are manufactured in the following manner: To thirty kilograms of a vegetable or animal oil—castor-oil, for instance—ten kilograms of pulverized picric acid are added, adding to the mixture when the acid is well mixed with the oil the base in a state of oxid or as a carbonate in quantities calculated to correspond to the saturation of the picric acid. The reaction takes place according to the theoretical formula, and the proportions of the acid and the base are easily ascertained in conformity with the atomic weights of the components. Thus, for instance, for ten kilograms of picric acid it would be necessary to add 2.440 kilograms of hydrate of potassium, (Kott's,) 1.220 kilograms of unslaked lime, 1.899 kilograms of calcined magnesia, 1.943 kilograms of hydrate iron sesquioxid, 4.850 kilograms of oxid of lead, (litharge,) or 5.810 kilograms of carbonate of lead, and so on. The alkalies, which are very soluble in water, are added in very concentrated solutions. The potash and soda could be added in solutions of a strength of 45° Baumé. Alcoholic solutions could also be employed. With regard to the alkaline-earth oxids employed—such as lime, baryta, or strontia—these may be added in the anhydrous state instead of as hydrates, and it is desirable that these bases should be finely powdered. As regards the other oxids, hydrated oxids or carbonates are generally used in the form of a fine powder. Certain oxids, however—such as the oxid of lead, the oxid of zinc, or magnesia—may be employed in the anhydrous state.

The process of the reaction is easily explained and is chiefly based on the solubility of picric acid in oil, the picrate formed allowing the oil to dissolve new quantities of picric acid until the reaction is completed. The reaction ought to take place in an apparatus provided with a condenser and so arranged that during the distillation of the volatile product it could be heated in a water-bath. The pulverization of the oxids or carbonates or use of the materials in a powdered state (indicated above) serves no other purpose than that of increasing the rapidity of the reaction. The combination may be effected either at the ordinary temperature or by heating previously in a water-bath at about 100° centigrade the oil mixed with the picric acid before the base is added.

With regard to the manufacture of alkaline or alkaline-earth picrates, the temperature developed by the reaction is sufficient at the beginning, and it will be sufficient to heat it in order to complete the reaction when the mixture is completed.

The proportion of the oil with which the reaction is effected may vary according to the effects intended to be obtained. However, in the case of the most sensitive picrates it would not be prudent to lessen too much the proportion of oil, and it is preferable not to reduce the proportion of oil below five kilograms for every ten kilograms of the picric acid.

In the case of manufacturing picrates in oil solutions it is possible to substitute for the oxids and the carbonates salts with fatty acids as bases—such as oleates, stearates, palmitates, and the like—of which the acid displaced by the picric acid dissolves in the oil.

The picrates prepared by any of the above-described processes may be freed from the oil in which they were formed by treating the mixture either with benzin or alcohol or ether or by any other suitable solvent for the oil, so as to obtain the picrate in an easily-volatilized medium, thereby avoiding all the inconveniences arising from the preparation of picrates in liquid solutions, (such as concentration, separation, drying by means of a stove or in the free air.) Moreover, the picrate obtained by this process is obtained directly in the form of a fine powder.

Having now particularly described and ascertained the nature of my said invention and in what manner the same is to be performed, I declare that what I claim is—

1. The process of preparing picrates, consisting in dissolving picric acid in a fatty oil, and then adding a base.

2. The process of preparing picrates, consisting in dissolving picric acid in a fatty oil, and then adding an oxid.

3. The process of preparing picrates, consisting in dissolving picric acid in an oil, then adding a base, and then treating the resulting mixture with a volatile solvent to separate the oil therefrom.

In testimony whereof I have signed this specification in the presence of two subscribing witnesses.

ADAM CHARLES GIRARD.

Witnesses:
EMILE LEDRET,
EDWARD P. MACLEAN.